United States Patent [19]

Neal

[11] 3,820,155

[45] June 25, 1974

[54] TELEVISION RECEIVER SERVICE ADJUSTMENT SYSTEM

[75] Inventor: David Lynn Neal, Indianapolis, Ind.

[73] Assignee: RCA Corporation, New York, N.Y.

[22] Filed: May 8, 1973

[21] Appl. No.: 358,294

[30] Foreign Application Priority Data

Aug. 29, 1972 Great Britain .................... 40080/72

[52] U.S. Cl. .......................................... 178/5.4 TE

[51] Int. Cl. .......................................... H04n 9/18

[58] Field of Search...... 178/5.4 TE, 5.4 BT, DIG. 4

[56] References Cited

UNITED STATES PATENTS 3,114,794 12/1963 Stark et al. .................... 178/5.4 TE 3,525,801 8/1970 Willis ............................ 178/5.4 TE

*Primary Examiner*—Robert L. Richardson

*Assistant Examiner*—R. Kniaz

*Attorney, Agent, or Firm*—Eugene M. Whitacre; Mason DeCamillis

[57] ABSTRACT

Apparatus for providing auxiliary reference signals useful in setting up the cutoff points of each of a plurality of electron guns in a color kinescope or picture tube. The reference signals are substituted in place of luminance signals by means of a service switch having at least "normal" and "service" positions. In the service or set-up mode of operation, with the reference signals applied and vertical scan collapsed, the screen grid to cathode voltage of each of the guns is adjusted to produce a dim white line on the kinescope. The polarity and amplitude of the reference signals is selected so that, upon return of the service switch to normal position and reconnection of the luminance signal channel, the conduction of each of the electron guns is decreased. As a result, the cutoff points of the guns correspond closely to luminance signal black level.

8 Claims, 2 Drawing Figures

TELEVISION RECEIVER SERVICE ADJUSTMENT SYSTEM

Figure 1:
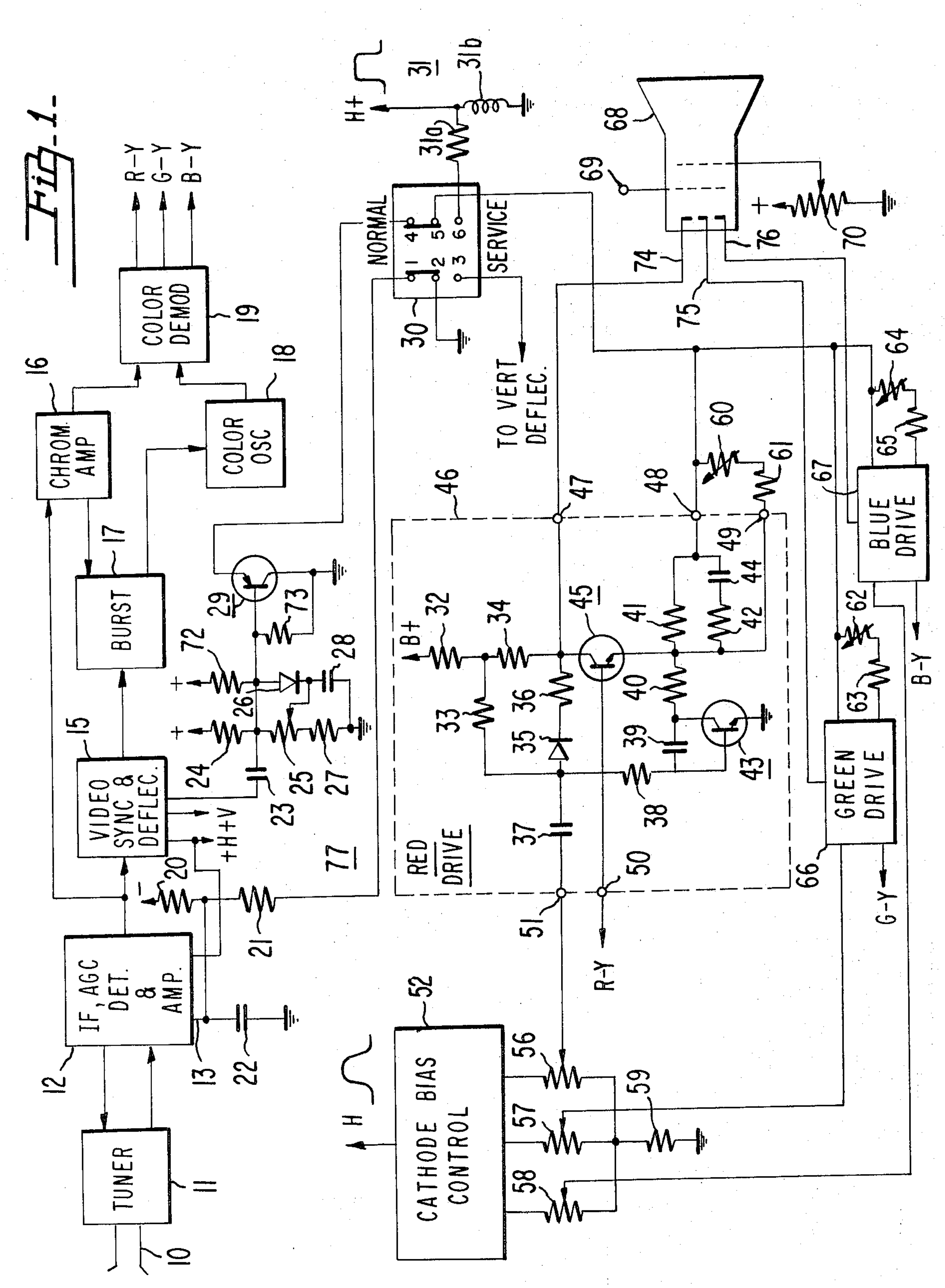

This invention relates to color television receivers and more particularly, to apparatus for controlling operating conditions of a color kinescope employed therein.

Present color television receivers typically employ both luminance and chrominance signal processing channels. Matrixing of the luminance and chrominance signals may be performed prior to the kinescope and, in that case, color-representative signals (R, G, B) are applied directly to one set of electrodes (e.g., the cathodes) of the kinescope. In another commonly employed system, the luminance signal (Y) is applied in common to the cathodes of the kinescope and appropriate color difference signals (R-Y, B-Y and G-Y) are applied separately to the first control grids of the kinescope. Matrixing is then performed in the kinescope. In either case, there should be adequate provision during the initial set-up of the color receiver for controlling the quiescent or bias potentials of the kinescope screen grids, control grids and cathodes for providing proper color balance between the three color signals. Furthermore, when no video signal is present, the flow of beam current between each cathode and the anode or ultor electrode should be approximately zero, i.e., the beam current should be near the threshold or cut-off level, producing a black screen when a black-representative video signal is present (including during the blanking period).

In many color television receivers, the cut-off point of each gun is adjusted by means of separate variable resistances which vary the screen grid bias potential of each electron gun with respect to ground. Additional separate drive controls associated with each cathode and, in some cases, an additional master bias control coupled to the control grids are provided for set-up of the kinescope. This multiplicity of controls is generally required in order to properly set-up a color television receiver because the operating characteristics of the several electron guns, as well as the efficiencies of associated phosphor materials, may be expected to vary one from another.

In color television receivers employing the recently announced precision, in-line gun picture tubes such as the RCA Type 15VADTCO1, only a single first control grid and a single screen grid are provided for the three cathodes. Thus, there is no provision for separate adjustment of red, green and blue gun screen potentials as in prior apparatus. Only the cathodes of the three guns are available for separate adjustment of the cutoff points of the guns.

In each of the above-mentioned cases, when the electron guns are to be adjusted to cutoff condition, the vertical sweep of the receiver typically is collapsed to concentrate the entire raster across a single horizontal line at the center of the kinescope. Appropriate controls associated with screen grid or cathode electrodes then are adjusted such that each gun is just turned on to produce a resultant narrow, dim white line across the kinescope. When the vertical circuits are again energized, the beam current which previously had been concentrated in a single line is spread over the entire screen and the face of the kinescope will appear to be dark. Such a procedure is described, for example, in U.S. Pat. No. 3,114,796, granted Dec. 17, 1963 in the names of John Stark, Jr. and Alton John Torre. In following such a procedure, it is customary to at least partially disable the luminance signal channel and to maintain a condition at the luminance signal channel output which is representative of a black image. In this manner, when the receiver is switched back to normal operation, the black level condition (cutoff of all three guns) will be appropriately adjusted.

These adjustments typically are made in the factory upon initial set-up of the receiver and subsequently may be made by service personnel when repairing or otherwise correcting operation of the receiver. It has been found that the subjective evaluation of a "dim white line" varies from person to person and also is dependent to a substantial degree upon ambient lighting conditions which exist when the receiver is set up. Thus, for example, when a receiver is set up in a brightly lighted room, the adjustment of the electron beam cutoff control to a point sufficient to produce a discernible white line under those conditions could cause a viewer to notice vertical and horizontal retrace lines in the raster, as well as undesired shading during dark scenes when the receiver is returned to its normal operating condition.

A further problem also may be encountered due to the method of set-up previously described. Certain circuits in the receiver are controlled during the horizontal blanking interval. These circuits may generate signals such as oscillatory (ringing) currents or voltages during the blanking interval. The blanking condition of the kinescope preferably is set to prevent any of these undesirable signal effects from appearing on the face of the kinescope, even when the ambient light level in the viewing room is low.

The set up procedure described above determines the kinescope blanking level, as well as image black level. It is therefore apparent that the brightness of the set-up line affects blanking of the kinescope. On the one hand, it is desired that this line be sufficiently bright to insure that a white line (low light color balance) is obtained. On the other hand, if the set-up line is too bright, the kinescope will not be properly blanked and undesired retrace lines and ringing signals may be seen on the face of the kinescope.

In accordance with the present invention, color television image reproducing apparatus is provided which includes a source of luminance signals and a color kinescope, the latter having a plurality of electron guns, each of which includes at least a cathode electrode. Means are associated with each of the electron guns for varying bias voltages applied thereto to control cutoff of electron beam current in each gun. Luminance signal amplifying means are provided for coupling luminance signals to the cathodes during a normal mode of operation of the apparatus. In addition, a source of reference signals is provided, the reference signals being of a polarity selected to produce increased conduction of the electron guns. A switching arrangement is provided to couple the source of luminance signals to the amplifying means in the normal mode of operation and to couple the source of reference signals to the amplifying means in a service mode of operation. The bias voltage varying means may thereby be adjusted during the service mode to produce a visible output (e.g., a white line) from the kinescope which, upon transfer of the switching arrangement to the normal mode of operation is diminished or extinguished.

Figure 2:
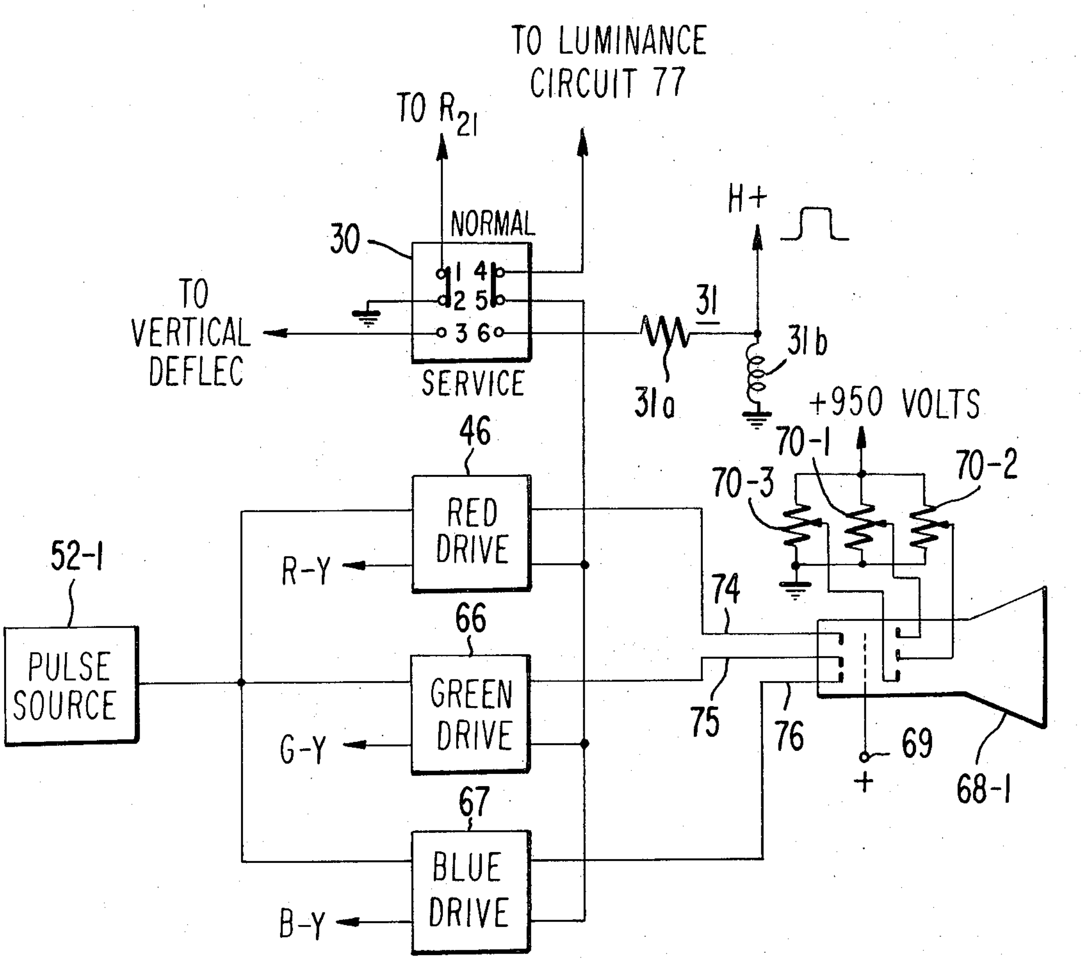

Various aspects of the invention will be described in the following specification, making reference to the accompanying drawing, in which:

FIG. 1 is a diagram partially in block form and partially in schematic circuit form of a first type of color television receiver embodying the present invention; and FIG. 2 is a diagram partially in block form and partially in schematic circuit form of a portion of a second type of color television receiver embodying the present invention.

Referring to FIG. 1, a television antenna 10 is provided for coupling transmitted television signals to the input of a tuner 11. The tuner 11 supplies an intermediate frequency (IF) signal to an IF amplifying, detecting and automatic gain control (AGC) circuit arrangement 12. The output of circuit arrangement 12 is coupled to a video amplifying, synchronizing signal separating and deflection circuit arrangement 15 and to a chrominance signal amplifier 16. Circuit arrangement 12 is coupled to an AGC filter capacitor 22 via a conductor 13. The operation of a suitable AGC circuit of this type is described in U.S. Pat. No. 3,634,620 of Jack R. Harford entitled "NOISE PROTECTED AGC CIRCUIT WITH AMPLITUDE CONTROL OF FLYBACK PULSES."

A resistance voltage divider 20, 21 is coupled between a source of direct voltage (−) and ground potential via terminals 1 and 2 of a "service switch" 30. The capacitor 22 is connected across resistor 21 when switch 30 is in the "NORMAL" position as is illustrated. AGC control of tuner 11 may also be supplied from the I.F.-AGC circuit 12.

The video, sync and deflection circuitry 15 supplies pulses (H and V) in timed relation with the operation of the horizontal and vertical deflection circuitry of the receiver and also provides an amplified luminance signal output. A horizontal pulse output of the video, sync and deflection circuitry 15 and an output of the chrominance amplifier 16 are coupled to a burst separator circuit 17 to retrieve the color synchronizing burst in a well known manner. The burst separator 17 is coupled, in turn, to a color oscillator 18 which provides a continuous wave output signal synchronized to the transmitted burst. Outputs from oscillator 18 and chrominance amplifier 16 are coupled to suitable color or chrominance demodulators 19. The demodulators 19 serve to demodulate the chrominance signals as a function of the phase and frequency of the synchronized oscillator reference signal. The outputs from demodulator 19 are conventionally referred to as color difference signals and are designated R-Y, G-Y and B-Y respectively. The color difference signals are coupled directly to red, green and blue drive modules 46, 66 and 67. In the drive modules 46, 66 and 67, the color difference signals are matrixed with a video signal representative of luminance information supplied from luminance circuitry generally shown as 77. The matrixed signals (R, G, B) are coupled from the drive modules 46, 66 and 67 to respective cathodes 74, 75 and 76 of a color kinescope or picture tube 68.

Considering the luminance circuitry 77, the video signal representative of luminance information is coupled from the video, sync and deflection circuitry 15 via a capacitor 23 to the base electrode of an emitter follower transistor 29. Transistor 29 is shown as a PNP device and includes a collector electrode coupled to a point of reference potential. A base biasing, voltage divider network including resistors 72 and 73 is coupled between a positive voltage supply terminal (+) and the point of reference potential. The junction between resistors 72 and 73 is coupled to the base electrode of transistor 29. A diode 26 and an A.C. bypass capacitor 28 are coupled in series between the base of transistor 29 and the reference voltage point. A further voltage divider including resistors 24, 25 and 27 is also connected between a voltage supply terminal and the point of reference potential. Resistor 25 is a potentiometer, the cathode of diode 26 being coupled to the wiper arm thereof to provide brightness control for the luminance signal. The emitter (output) electrode of transistor 29 is coupled to terminal 4 of the service switch 30.

In the "NORMAL" position of service switch 30 (as shown), terminals 1 and 2 serve to return resistor 21 in the AGC circuit to ground, while terminals 4 and 5 serve to couple the luminance signal to the red, green and blue drive modules 46, 66, 67 (e.g., to terminal 48 of red drive module 46).

In the "SERVICE" position of switch 30, terminals 2 and 3 serve to disable the vertical deflection circuitry by, for example, applying ground potential to a height control potentiometer (not shown) of the vertical deflection circuit. At the same time, terminals 5 and 6 of switch 30 serve to disconnect the luminance input to the driver stages 46, 66, 67 and to substitute in its place the output of a signal supply 31.

In the illustrated embodiments of the invention, the reference signal supply 31 is arranged to provide a waveform which recurs at the horizontal scanning rate and includes a positive-going pulse portion occurring during the horizontal retrace interval. Supply 31 comprises, for example, a series resistor 31*a* and a winding 31*b* on the horizontal flyback transformer included within the circuit 15.

Considering the drive modules 46, 66 and 67, the circuitry included therein is identical in each case and is described in detail in U.S. Pat. No. 3,619,488 granted in the name of Donald H. Willis. Those circuits therefore will only be described here in terms sufficient for an understanding of the present invention.

The red color difference signal R-Y from color demodulator 19 is coupled to the red drive module 46 via terminal 50. In a similar manner, the G-Y and B-Y color difference signals from color demodulator 19 are respectively coupled to the color difference input terminals of the green and blue drive modules 66 and 67.

Considering the red drive module 46 which is shown in detail, the matrixed output thereof (R) is obtained from terminal 47 and is directly coupled to the red cathode 74 of kinescope 68. Red drive module 46 comprises a bias regulating transistor 43 and an output amplifying transistor 45. The operating point of transistor 43 and, hence, of transistor 45 is determined by means of the bias resistor networks including resistors 32, 33, 38 and a clamp circuit comprising capacitor 37, diode 35 and resistor 36. The clamp circuit 35, 36, 37 operates to maintain the peak of a repetitive pulse waveform supplied to terminal 51 (details of which will be explained below) clamped approximately to the voltage present at the collector of transistor 45 during the horizontal retrace interval. A resultant direct voltage produced at the junction of resistors 33 and 38 regulates conduction of transistor 43 and thereby of transistor 45 in a manner which will be explained below.

An adjustable red drive control resistor 60 is provided in the network 60, 61, 41, 42, 44 which serves to couple either the luminance signal output of transistor 29 or the reference signal supplied by source 31 to drive module 46 (similar drive controls 62 and 64 are associated with modules 66 and 67).

Kinescope 68 includes a control grid 69 coupled to an adjustable voltage supply of, for example, +15 volts and a screen grid coupled to a screen grid voltage supply 70 adjustable for supplying a voltage between +400 and +900 volts (the potentiometer typically is provided with limit stops). In the illustrated embodiment of the invention, a single screen grid and single control grid are shown as noted above. The individual D.C. cut-off controls for the guns of the kinescope 68 are supplied by a cathode bias control circuit 52.

Cathode bias control circuit 52 comprises a parallel combination of potentiometers 56, 57 and 58 coupled to a single source of a repetitive pulse waveform (+H). A resistor 59 is connected between the low voltage end of potentiometers 56, 57, 58 and ground. The wiper of potentiometer 56 is coupled to input terminal 51 of the red drive module 46, while the wipers of potentiometers 57 and 58 are coupled, respectively, to green drive module 66 and blue drive module 67. The repetitive pulse waveform applied to bias control 52 is supplied, for example, from a further winding (not shown) on the horizontal flyback transformer of the video, sync and deflection circuitry 15. That waveform therefore recurs at the horizontal (line) rate and includes a relatively positive pulse portion of relatively short duration and a relatively negative portion of longer duration. Details of a suitable cathode bias control circuit are described in U.S. Patent Application Ser. No. 332,685, filed Feb. 15, 1973 in the name of James Courtland March, Jr.

When switch 30 is in its "NORMAL" position, the operation of the red drive module is as follows. Luminance signals are supplied from the emitter of transistor 29 via terminals 4 and 5 of switch 30 and the drive control networks to the emitter of transistor 45. The R-Y output of color demodulator 19 is coupled to the base of transistor 45. The luminance gain at the collector electrode of transistor 45 is approximately determined by the ratio of resistor 34 to resistor 60 and is adjusted in the set-up procedure in a manner which is described below. Transistor 45 is responsive to both the color difference signal and the luminance signal for providing at its collector electrode a color signal (R) which is then applied to the cathode 74 of the kinescope. Capacitor 39 and the internal capacitance between the base and collector electrodes of transistor 43 effectively filter or bypass all A.C. signals from the electrodes of transistor 43 and further act as a current source for biasing of transistor 43. The base electrode of transistor 43 is biased by means of the voltage appearing at the junction of the series combination of resistors 38 and 33. A horizontal rate pulse, the amplitude of which is determined by the position of the wiper of potentiometer 56, is applied to the clamp circuit 35, 36, 37. The positive-going horizontal pulse will tend to forward bias diode 35 so as to cause the peak of the voltage waveform at the junction between resistors 33 and 38 to be clamped to approximately the voltage present at the collector electrode of transistor 45 at that time (horizontal retrace).

For example, assume that the controllable horizontal pulse as applied to capacitor 37 is set at approximately 180 volts peak-to-peak and is a relatively rectangular pulse waveform. Furthermore, due to the duty cycle, which is determined by the horizontal repetition rate and the pulse width, assume the average value of such pulse is 150 volts below the peak positive portion. When the diode 35 is caused to conduct, the peak voltage at the anode thereof will be clamped to approximately the voltage at the collector electrode of transistor 45. The average (D.C.) value of the pulse waveform applied to terminal 51 will appear across capacitor 37. If the difference between the peak and average values of the pulse waveform (150 volts) is approximately equal to the voltage at the collector of transistor 45, the average (D.C.) voltage at the junction of resistors 33 and 38 will be zero.

If the voltage at the collector electrode of transistor 45 is greater than the 150 volt peak-to-average difference of the pulse waveform, the D.C. (average) voltage at the anode of diode 35 will be greater than zero. This positive voltage serves to forward bias transistor 43, enabling it to draw current through the emitter circuit of transistor 45. The additional emitter current causes a drop in collector voltage of transistor 45 and hence serves to maintain the collector voltage at a value close to the 150 volts or the difference between the D.C. average value of the pulse and the positive peak value of the pulse.

On the other hand, if the collector voltage of transistor 45 is less than 150 volts, then the average D.C. voltage at the anode of the diode 35 will be negative. This action serves to reduce conduction of transistor 43 which therefore reduces the current drawn by transistor 45. This action then serves to raise the collector potential of transistor 45 so that the collector electrode is maintained at, for example, the desired 150 volts. The stability afforded by the operation of the circuit is maintained despite variations in circuit and component values and further, in spite of variations in the applied operating potentials, but the collector potential of transistor 45 will change with change in amplitude of the peak-to-average value of the pulse coupled to capacitor 37.

This characteristic of the circuit is utilized in connection with "setting-up" or initially adjusting the operating conditions of the picture tube 68. Specifically, resistors 56, 57 and 58 are adjusted to set the cutoff condition of each of the three guns of picture tube 68. As is customary in other types of color television receivers, the set-up procedure involves placing service switch 30 in the "SERVICE" position. This action transfers the ground connection of terminal 2 from the AGC circuit associated with terminal 1 to the vertical deflection circuit associated with terminal 3. The raster is collapsed to a single horizontal line by virtue of the latter connection. The I.F. amplifier stages are cut off by the operation of the AGC circuit so as to preclude video or color perturbations of the single line produced on picture tube 68. Furthermore, the outputs of color demodulators 19 will then all assume their quiescent (no color) levels which, for example, may be +5 volts. This condition corresponds to the outputs of demodulators 19, which would be present for a black level (or any gray scale) signal. Finally, the luminance amplifier transistor 29 is disconnected at switch terminals 4 and 5 from each of the drive modules 46, 66, 67 and the reference signal source 31 is substituted in its place.

It can be seen that disconnecting transistor 29 from the drive modules produces a similar effect in the drive modules as cutting off current flow in transistor 29. By virtue of the characteristics of the illustrated circuit arrangement, this corresponds to a black level luminance signal condition. The reference signal source 31 is arranged to modify this condition to permit generation of a visible white line across picture tube 68 in the service mode and to permit return to the desired black level (cutoff) condition for all three guns when switch 30 is returned to normal position. The set-up procedure is as follows.

The screen control 70 is set at minimum voltage. Each of drive controls 60, 62, 64 is set at a maximum value. Each of the guns is turned completely off by adjusting resistors 56, 57 and 58 to their maximum positive voltage positions. The screen control 70 is advanced until a line barely appears on picture tube 68. Each of the potentiometers 56, 57 and 58 is then adjusted, in turn, to illuminate the respective phosphors of picture tube 68. A low brightness white line should be produced as a result of the adjustment of all three potentiometers. The service switch 30 is then returned to its "NORMAL" position and the drive controls 60, 62, 64 are adjusted to produce the desired color temperature (e.g., 9,300° K) of a white raster at a normal setting of brightness control 25.

The effect of the connection of reference source 31 to each of the drive modules 46, 66 and 67 will now be explained.

When switch 30 is placed in the service position, a positive-going horizontal rate pulse is coupled via resistor 31*a* to the emitter of transistor 45. The ohmic value of resistor 31*a* is chosen according to the desired operating current level. The applied pulse appears at the collector of amplifier transistor 45 during the horizontal retrace time, that is at the same time and of the same polarity as the positive-going pulse supplied to clamp circuit 35, 36, 37 from cathode bias control 52. Since the voltage at the collector of transistor 45 thereby is increased positively, the peak of the pulse supplied to the clamp circuit is clamped to a higher voltage than if reference source 31 were not operating. As a result, the voltage for biasing the base of transistor 43 also increases, causing transistor 43 to conduct more current. During the scan or trace interval, when the pulse supplied by source 31 is absent, the collector voltage of transistor 45 will drop. Potentiometer 56 is then adjusted to just turn on red cathode 74 in the manner described above. For any selected brightness of the set-up line, transistor 45 is maintained in conduction at a current level somewhat greater than if the pulse were not applied from source 31. Typically, the collector voltage of transistor 45 during the video portion of the scan may be approximately 175 volts under the above-described conditions. When the service switch 30 is returned to normal position, and the pulse supplied by source 31 is removed from the emitter of transistor 45, the voltage which appears at the collector of transistor 45 during horizontal retrace will be lower. The clamping voltage associated with clamp circuit 35, 36, 37 will therefore be lower, causing transistor 43 to conduct less. As a result, the collector voltage of transistor 45 may increase by approximately 5 volts to 180 volts during the trace or video portion of the horizontal deflection interval. This increase is in a direction to cut-off the beam current supplied by cathode 74 (or the cathodes 75 and 76 when controls 57 and 58 have been adjusted).

Since an adjustment is made during set up for producing a white line rather than a very dim line, ambient light conditions of the room will have less of an effect upon the actual cutoff of the electron guns. That is, a white line of sufficient brightness is easier to adjust for than a white line approximately near cutoff as was done in prior systems.

Referring to FIG. 2, the kinescope 68 of FIG. 1 is replaced by a kinescope 68-1 having separate screen controls for each of the cathodes. Adjustment of the voltages supplied to each of the screens are provided by means of potentiometers 70-1, 70-2 and 70-3. Typically, the first control grids are supplied with a bias voltage supply 69 but may be separately connected. The red drive, green drive and blue drive modules 46, 66 and 67 respectively, are identical to the drive modules shown in FIG. 1. A single, fixed amplitude pulse may now be supplied by cathode bias control 52 to all three drive modules 46, 66, 67. Typically, this pulse can be of the order of 210 volts peak-to-peak. The operation of the drive module circuitry is identical to that described previously. In the set-up procedure, however, instead of using cathode bias control 52.1 to vary the cutoff of the individual cathodes as was discussed in connection with FIG. 1, the voltages on the individual screen grids are adjusted in accordance with the following procedure. Switch 30 is switched to the service position, thereby modifying the AGC circuitry and grounding the height control of the vertical deflection circuits as previously described. The luminance channel 77 is disconnected from the inputs of the three drive modules and resistor 31*a* is coupled to the respective luminance input terminals of the three drive modules. Potentiometers 70-1, 70-2 and 70-3 are adjusted in turn until each cathode conducts sufficiently to produce a resultant white line across the screen of the kinescope 68-1. Switch 30 is switched to the normal position and the line that appears on the screen will disappear as previously described. Proper adjustment of cutoff of the three electron guns is thereby achieved. Remaining color temperature adjustments described above are then made.

Typical examples of circuit components which may be employed in the illustrated embodiments are as follows:

FIGURE 1

| | |
|---|---|
| transistor **43** | SE4021 |
| transistor **45** | 2N3440 |
| resistor **31a** | 10,000 ohms |
| resistor **32** | 10,000 ohms |
| resistor **33** | 2,200,000 ohms |
| resistor **34** | 10,000 ohms |
| resistor **36** | 3,900 ohms |
| resistor **38** | 220,000 ohms |
| resistor **40** | 180 ohms |
| resistor **41** | 220 ohms |
| resistor **42** | 39 ohms |
| resistor **53** | 2,200 ohms |
| resistor **55** | 270 ohms |
| resistors **56, 57, 58** | 10,000 ohms variable |
| resistor **59** | 5,600 ohms |
| resistor **70** | 1,000,000 ohms |
| resistor **81** | 560 ohms |
| capacitor **37** | 0.01 microfarads |
| capacitor **39** | 1.5 microfarads |
| capacitor **44** | .680 microfarads |
| color kinescope **68** | RCA 15 VAD TC01 |

FIGURE 2

| | |
|---|---|
| resistor **31a** | 15,000 ohms |
| resistors **70-1, 70-2, 70-3** | 1,500,000 ohms |
| color kinescope **68-1** | RCA 19VCTP22 |

The embodiment of FIG. 1 typically utilizes a horizontal pulse into circuit 52 of 400 volts peak-to-peak. Furthermore, a pulse duration of approximately 12 microseconds, a rise time of the pulse of about 2 microseconds and a fall time of about 2 microseconds are suitable.

The embodiment of FIG. 2 typically may be operated with a 210 volt peak-to-peak pulse supplied to drive modules 46, 66 and 67 of like duration as that described above.

It should be recognized that modifications may be made to the circuits without departing from the scope of the invention, the illustrated arrangements having been shown as examples of practical circuits.

What is claimed is:

1. In a color television image reproducing apparatus including a source of luminance signals and a color kinescope having a plurality of electron guns, each gun having a separate cathode, a service adjustment system comprising:

amplifying means for coupling at least said luminance signals to said cathodes during a normal mode of operation of said apparatus, means associated with each of said electron guns for varying bias voltages applied thereto to control cutoff of electron beam current in each of said guns, a source of reference signals, said signals being of a polarity to cause increased conduction of said electron guns upon coupling of said source to said amplifying means, and switching means for coupling said source of luminance signals to said amplifying means in a normal mode of operation and for coupling said source of reference signals to said amplifying means in a service mode of operation, said reference signals being of such amplitude that said bias voltage varying means may be adjusted during said service mode to produce conduction in said guns and a resulting visible pattern on said kinescope and, upon transfer of said switching means to said normal mode of operation, conduction in said guns and the intensity of said pattern are diminished.

2. A service adjustment system according to claim 1 wherein:

said means for varying bias voltages applied to said electron guns is adjustable, upon coupling of said source of reference signals to said amplifying means in the service mode of operation, to vary conduction of each of said electron guns between at least a cutoff condition and conduction sufficient to produce a visible pattern on said kinescope.

3. A service adjustment system according to claim 2 wherein:

the amplitude of said reference signals is such that, upon transfer of said switching means to said normal mode of operation, conduction in said guns is reduced substantially to cutoff.

4. A service adjustment system according to claim 3 wherein:

said switching means is further arranged for disabling operation of one of the vertical and horizontal beam deflection systems associated with said kinescope such that said visible pattern is in the form of a relatively narrow line on said kinescope.

5. A service adjustment system according to claim 3 wherein:

said means associated with each of said electron guns is arranged for varying bias voltages applied between the screen grid and cathode of each of said guns.

6. A service adjustment system according to claim 1 wherein:

said amplifying means comprises a plurality of amplifier circuits equal in number to said cathodes, each amplifier circuit having at least an output electrode direct current coupled to one of said cathodes, a first input electrode for application thereto of luminance signals and a clamping circuit coupled to said output electrode for substantially maintaining a predetermined quiescent direct voltage at said output electrode in said normal mode of operation, and said source of reference signals is arranged to provide signals to said clamping circuit in said service mode to modify said quiescent direct voltage in a direction to increase conduction of each of said guns.

7. A service adjustment system according to claim 6 wherein:

said reference signals include pulses occurring during each horizontal deflection retrace interval.

8. A service adjustment system according to claim 7 wherein:

said switching means is further arranged for disabling operation of one of the vertical and horizontal beam deflection systems associated with said kinescope such that said visible pattern is in the form of a relatively narrow line on said kinescope.

* * * * *

UNITED STATES PATENT OFFICE
CERTIFICATE OF CORRECTION

Patent No. 3,820,155 Dated June 25, 1974

Inventor(s) David Lynn Neal

It is certified that error appears in the above-identified patent and that said Letters Patent are hereby corrected as shown below:

At column 5, line 39, "March" should read --Marsh--. At column 8, line 23, "52" should read --52-1--; at line 28, "52.1" should read --52-1--.

Signed and sealed this 5th day of November 1974.

(SEAL)
Attest:

McCOY M. GIBSON JR.
Attesting Officer

C. MARSHALL DANN
Commissioner of Patents